US008666072B2

(12) United States Patent
Tronel et al.

(10) Patent No.: US 8,666,072 B2
(45) Date of Patent: Mar. 4, 2014

(54) METHOD AND A SYSTEM FOR RECEIVING A MULTIMEDIA SIGNAL, A CRYPTOGRAOPHIC ENTITY FOR SAID RECEPTION METHOD AND SYSTEM, AND A METHOD AND A BLACK BOX FOR PRODUCING SAID CRYPTOGRAPHIC ENTITY

(75) Inventors: Bruno Tronel, Courbevoie (FR); Franck Baudot, Velizy (FR)

(73) Assignee: Viaccess, Paris la Defense Cdx (FR)

( * ) Notice: Subject to any disclaimer, the term of this patent is extended or adjusted under 35 U.S.C. 154(b) by 1309 days.

(21) Appl. No.: 11/815,938

(22) PCT Filed: Feb. 14, 2006

(86) PCT No.: PCT/FR2006/000335
§ 371 (c)(1),
(2), (4) Date: Jun. 3, 2009

(87) PCT Pub. No.: WO2006/085017
PCT Pub. Date: Aug. 17, 2006

(65) Prior Publication Data
US 2009/0238363 A1    Sep. 24, 2009

(30) Foreign Application Priority Data

Feb. 14, 2005   (FR) ...................................... 05 01466

(51) Int. Cl.
*H04N 7/167* (2011.01)
*H04L 29/06* (2006.01)
*H04L 9/32* (2006.01)

(52) U.S. Cl.
USPC ........... 380/239; 380/200; 380/259; 380/277; 380/278; 380/283; 713/159; 713/161; 713/163; 713/168; 713/169; 713/170; 713/171; 726/3; 726/5; 726/9; 726/26; 726/30

(58) Field of Classification Search
USPC .............. 380/239, 259; 713/171, 163; 726/26
See application file for complete search history.

(56) References Cited

U.S. PATENT DOCUMENTS

| 6,266,415 | B1 | 7/2001 | Campinos et al. | |
|---|---|---|---|---|
| 6,402,028 | B1 | 6/2002 | Graham, Jr. et al. | |
| 6,904,522 | B1 * | 6/2005 | Benardeau et al. | 713/156 |
| 7,191,335 | B1 * | 3/2007 | Maillard | 713/176 |
| 7,239,704 | B1 * | 7/2007 | Maillard et al. | 380/210 |
| 7,590,860 | B2 * | 9/2009 | Leporini et al. | 713/185 |
| 2002/0129249 | A1 * | 9/2002 | Maillard et al. | 713/172 |
| 2002/0146127 | A1 * | 10/2002 | Wong | 380/270 |
| 2004/0068541 | A1 * | 4/2004 | Bayassi et al. | 709/204 |

(Continued)

FOREIGN PATENT DOCUMENTS

EP    1 026 898    8/2000

*Primary Examiner* — Christopher Brown
*Assistant Examiner* — Jenise Jackson
(74) *Attorney, Agent, or Firm* — B. Aaron Schulman, Esq.; Stites & Harbison, PLLC.

(57) ABSTRACT

This method of receiving a multimedia signal scrambled by means of a control word uses a first cryptographic entity that can be connected to any one of P second cryptographic entities to form part of a device for receiving the scrambled multimedia signal. Only second cryptographic entities of a group of N second cryptographic entities selected from a wider set of P second cryptographic entities use a session key obtained by diversifying a root key identical to the root key used to obtain the session key of the first cryptographic entity.

20 Claims, 5 Drawing Sheets

(56) References Cited

U.S. PATENT DOCUMENTS

| | | |
|---|---|---|
| 2004/0083364 A1 | 4/2004 | Andreaux et al. |
| 2004/0250274 A1 | 12/2004 | Genevois |
| 2006/0107045 A1* | 5/2006 | Le Buhan et al. ............. 713/168 |
| 2012/0240147 A1* | 9/2012 | Rodriguez ..................... 725/25 |

* cited by examiner

METHOD AND A SYSTEM FOR RECEIVING A MULTIMEDIA SIGNAL, A CRYPTOGRAOPHIC ENTITY FOR SAID RECEPTION METHOD AND SYSTEM, AND A METHOD AND A BLACK BOX FOR PRODUCING SAID CRYPTOGRAPHIC ENTITY

The present invention relates to a method and a system for receiving a multimedia signal, to a cryptographic entity for said reception method and system, and to a method and a black box for producing said cryptographic entity.

In this description, the terminology used is that routinely used in the field of scrambled multimedia transmission systems. For an introduction to that terminology and to scrambled multimedia signal transmission systems, the reader may consult the following paper:

"A single conditional access system for satellite-cable and terrestrial TV", Françoise Coutrot, Vincent Michon, Center Commun d'Etudes de Télédiffusion and Télécommunication, Cesson-Sévigné, France, IEEE Transactions on Consumer Electronics, Vol. 35, No. 3, August 1989.

Known methods of receiving multimedia signals scrambled using a control word use a first cryptographic entity adapted to be connected to any one of P second cryptographic entities to form a portion of a device for receiving the scrambled multimedia signal.

For example, the first cryptographic entity is a security processor such as a smart card and the second entity is a multimedia signal descrambling unit.

In those known methods, if the first entity is connected to any of the P second cryptographic entities to form a portion of a device for receiving a scrambled multimedia signal, then the first entity encrypts the control word or the multimedia signal descrambled using a session key and then sends the encrypted control word or the encrypted multimedia signal to the second entity, and that second entity decrypts the encrypted control word or the encrypted multimedia signal sent by the first entity using a session key. The session keys of the first and second entities are obtained by diversifying root keys using the same identifier known to the first and second entities.

In known methods, in order to obtain an identical session key in first and second entities connected to each other, there is provided a stage of initializing the session key, for example, at the time of the first use of the first entity with the second entity. During this initializing stage, an identifier of the second entity is sent to the first entity. The first entity diversifies a root key using an identifier of the second entity to obtain the session key. In a similar way, the second entity diversifies the same root key using its own identifier to obtain an identical session key. Thus, in known methods, the first entity is usable in any of the second entities.

It is nevertheless desirable, under some circumstances, to render the first entity usable only with a particular group of N second entities chosen from the larger set of P second entities. This first entity is then said to be matched to this particular group of second entities.

Consequently, the invention aims to propose a method of receiving a multimedia signal scrambled using a control word, in which a first cryptographic entity is matched with a group of N second cryptographic entities.

The invention therefore consists in a reception method of the above kind in which only the second entities from a group of N second entities chosen in the larger set of P second entities use a session key obtained by diversifying a common root key identical to the root key used to obtain the session key of the first entity, N being a number of second entities strictly less than P and strictly greater than 1.

Consequently, in the above method, only the second entities of the group of N second entities obtain a session key identical to that used by the first entity. Accordingly, this first entity can be used in any of the second entities from the group. In contrast, if this first entity is used in a second entity that does not belong to the group, the session key that the first entity obtained is different from that which the second entity obtains, which renders this first entity unusable in this second entity.

Implementations of this reception method may have any of the following features:
- after connection of the first entity to one of the second entities of said group, at least the first entity or the second entity diversifies the root key stored by said identifier to obtain the session key using a diversification module and then renders that diversification module unusable for the creation of a new session key so as to match that entity only to the other entity to which it is connected;
- the diversification module is rendered unusable by rendering the root key to be diversified unusable;
- after connection of the first entity to one of the second entities, either the first entity or the second entity sends the identifier to the other entity in unencrypted form;
- after connection of the first entity to one of these second entities, the first entity selects the session key or the root key for obtaining the session key to be used as a function of a protection mode that the first entity imposes on the second entity or used by the second entity;
- the first entity is a security processor and the second entity is a descrambler unit or the first entity is a descrambler unit and the second entity is a scrambled multimedia signal receiver.

The implementations of the reception method also have the following advantages:
- rendering the diversification module unusable for the creation of the session key after the connection and the initialization of the session key between a first entity and a second entity creates a strong match between these two entities since the entity that diversified the root key to obtain the session key becomes usable only with the other entity to which it is connected;
- rendering the diversification module unusable by rendering the root key unusable for the creation of a new session key produces a reversible strong match that can be eliminated;
- sending the identifier in clear avoids the use of a mechanism for encrypting the identifier and managing the associated secrets and furthermore means that no information need be given on the encryption methods used in the first and second entities;
- the possibility of selecting the session key as a function of the protection mode employed by the second entity means that the first entity can adapt or block its operation when it is used with second entities using different protection modes, for example, with second entities of different generations. Moreover, if the secrets relating to obtaining one of the session keys in one of the protection modes become known, it is possible to continue to use the two entities in a totally secure way by using the other protection mode, provided that the second entity supports that other mode.

The invention also consists in a second entity of a device for receiving a multimedia signal scrambled using a control word, adapted to be used in the above reception method. This second entity is adapted to decrypt the encrypted control word or the encrypted multimedia signal sent by the first entity using the session key. The session used by the second entity is obtained by diversifying a root key identical to the root key used to obtain the session keys of the group of N second entities.

Embodiments of this second entity can have one or more of the following features:
- a memory containing a prestored cryptogram of the session key;
- a transmission module adapted to send the identifier in unencrypted form to the first entity after connection of the first entity to the second entity;
- a security integrated circuit including a secure memory containing a decryption key and a first algorithm for decrypting the prestored cryptogram to obtain the session key, and a second algorithm for decrypting the encrypted control word or the encrypted multimedia signal sent by the first entity using the session key decrypted by the first algorithm;
- an unsecure memory in which is stored a cryptogram of the session key, that cryptogram having been obtained by encrypting the session key with a secret key; and a security integrated circuit containing:
  a) a secure memory in which the secret key is stored; and
  b) an algorithm for decrypting the cryptogram using the secret key.

These embodiments of the second entity have the following further advantages:
- using a session key prestored in the second entity avoids implementing in that second entity a diversification module identical to that used to obtain the session key of the first entity. This makes the receiver device more secure since any such diversification module would be exposed to attempted cryptanalysis;
- using security integrated circuits also makes the receiver device more secure since the session key is decrypted only in the integrated circuit and these integrated circuits are more difficult to cryptanalyze; and
- storing a cryptogram of the session key in an unsecure memory makes it easier to modify the session key without compromising the level of security of the receiver device since the secret key is stored in a secure memory.

The invention further consists in a receiver system for receiving a multimedia signal scrambled using a control word, that system including a first cryptographic entity and P second cryptographic entities, the first cryptographic entity being adapted to be connected to any one of the P second cryptographic entities to form a portion of a device for receiving the scrambled multimedia signal, the first entity being adapted to encrypt the control word or the multimedia signal descrambled using a session key and to send the control word or the multimedia signal encrypted in this way to the second entity to which it is connected, each second entity being adapted to decrypt the encrypted control word or the encrypted multimedia signal sent by the first entity using a session key, the session keys of the first and second entities being obtained by diversifying a root key using the same identifier. In this receiver system, only the second entities of a group of N second entities chosen in the larger set of P second entities are adapted to use a session key obtained by diversifying a common root key and identical to the root key used to obtain the session key of the first entity, N being a number of second entities strictly less than P and strictly greater than 1.

The invention further consists in a system for fabricating a second entity including a security integrated circuit as described above, that system including:
- a central database in which is stored, for each security integrated circuit usable for the fabrication of the second entity, a unique identifier of that integrated circuit associated with the cryptogram obtained by encrypting the session key with the secret key prestored in the secure memory of the integrated circuit;
- a first unit for fabricating the second entity using a security integrated circuit including the unique identifier of that integrated circuit and the secure memory in which the secret key is prestored, this first fabrication unit being adapted to store in the unsecure memory of the second entity the cryptogram of the session key;
- a first black box adapted:
  1) to retrieve the unique identifier of the integrated circuit used to fabricate the second entity; and
  2) to send the first fabrication unit, in response, the cryptogram associated with the identifier retrieved in the central database so that the first fabrication unit can store that cryptogram in the unsecure memory of this second entity.

Such a fabrication system means that the appropriate cryptogram of the session key can be stored in the unsecure memory without the first fabrication unit knowing the secret key for decrypting that cryptogram.

Embodiments of this fabrication system can have one or more of the following features:
- a second unit for fabricating security integrated circuits, this second fabrication unit being adapted to store in the secure memory of each fabricated integrated circuit the secret key and the unique identifier of the integrated circuit; and
- a second black box adapted send to the second fabrication unit the identifier of the integrated circuit and the secret key to be stored in the secure memory of the fabricated integrated circuit.

Embodiments of the above fabrication system further have the following advantages:
- when the second black box is adapted to send the identifier of the security integrated circuit, this avoids having to supply the central database with an identifier generated by the second fabrication unit.

The invention further consists in black boxes specifically adapted to be used in the fabrication system described above and a method of fabricating a second entity.

The invention further consists in a method of fabricating a second entity adapted to be used in the above fabrication system.

The invention can be better understood on reading the following description, which is given by way of example only and with reference to the drawings, in which.

Figure 1:
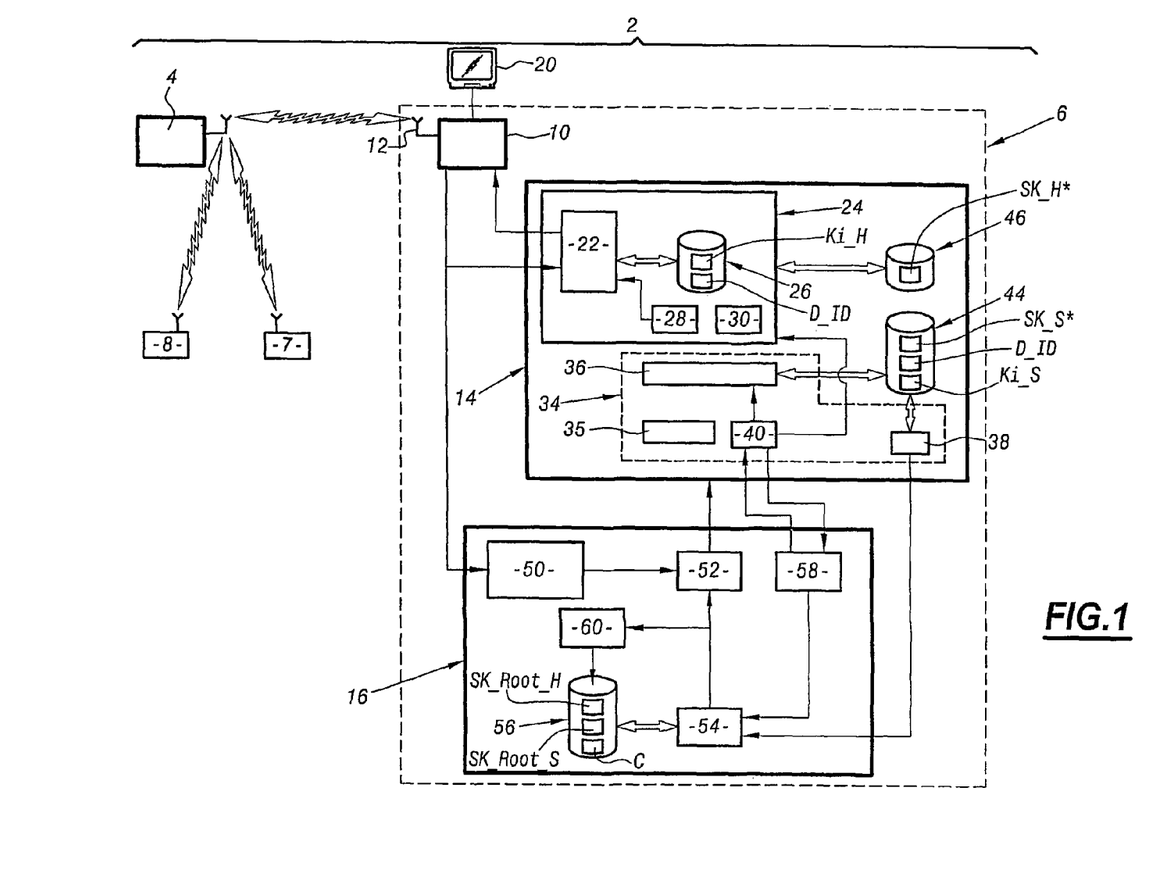
FIG. 1 is a diagrammatic illustration of the architecture of a system for sending and receiving a scrambled multimedia signal.

FIG. 1 represents a system, generally referred to as 2, for sending and receiving a scrambled multimedia or audiovisual signal such as television broadcasts or multimedia programs, for example. The system 2 includes a transmitter 4 adapted to broadcast simultaneously to a plurality of receiver devices the multimedia signal scrambled using a control word. This transmitter 4 is also adapted to send each of the receiver devices entitlement control messages (ECM) containing the control word that can be used to descramble the multimedia signal and entitlement management messages (EMM) containing information for managing the access rights of users.

To simplify FIG. 1, only three receiver devices 6 to 8 are represented. Only the details of the device 6 necessary for understanding the invention are described here. The devices 7 and 8 differ from the device 6 only in the nature of the information stored in those devices.

The device 6 is, for example, formed of three entities, namely:
- a receiver or decoder 10 connected to a distribution network, by means such as represented here by an antenna 12, to receive scrambled multimedia signals broadcast by the transmitter 4 and to decode them after they are descrambled;
- a unit 14 for descrambling the received multimedia signals; and
- a removable security processor 16 adapted to decrypt the control word contained in an entitlement control message.

Below, references to a control word apply to one or more of the control words of an entitlement control message.

The receiver 10 is also connected to a display unit 20 such as a television set, on which the multimedia signal descrambled by the unit 14 is displayed.

The unit 14 takes the form of a removable PCMCIA (Personal Computer Memory Card International Association) card, for example, intended to be inserted into the receiver 10, and the unit 14 conforms to the EN 50221 standard "Common Interface Specification for Conditional Access and other Digital Video Broadcasting Decoder Applications". To this end, the receiver 10 and the unit 14 are each equipped with connectors for mechanically coupling and uncoupling the unit 14 and the receiver 10.

This unit 14 includes a descrambler 22 adapted to descramble the multimedia signal scrambled using the control word.

Here the descrambler 22 forms part of a security integrated circuit 24.

For example, the unit 14 is adapted to use a hardware protection mode and a software protection mode to protect its interface with the processor 16:
- in the hardware protection mode, the cryptographic functions and the memories containing the associated keys used to protect this interface are used by the hardware, such as a security integrated circuit;
- in the software protection mode, these functions and memories are used by the software, and this mode is used in particular in a unit 14 having no security integrated circuit such as the circuit 24.

To use the hardware protection mode, the integrated circuit 24 includes a secure memory 26 and two decryption modules 28 and 30.

The memory 26 is provided with mechanisms to make it difficult for an unauthorized person to read its contents. Because of these mechanisms, it is possible to store information in this memory 26 only during the fabrication or customization of the integrated circuit and in any event before it is integrated into a descrambler unit.

This memory 26 contains an identifier D_ID of the unit 14 and a secret key Ki_H.

The decryption module 28 is adapted to decrypt a cryptogram CW* of a control word and the decryption module 30 is adapted to decrypt a cryptogram SK_H* of a session key using the key Ki_H.

The unit 14 also includes a conditional access software module 34 that is further adapted to manage the interface between the unit 14 and the security processor 16.

To use the software protection mode, this software module 34 here includes, amongst others:
- a software module 35 for decrypting the cryptogram CW*; and
- software module 36 for decrypting a cryptogram SK_S* of a session key using a secret key Ki_S.

The software module 34 also includes a module 38 for sending the identifier D_ID to the processor 16 and a module 40 for activating one of the interface protection modes under the control of the security processor 16.

Finally, the unit 14 includes an unsecure memory 44 containing the identifier D_ID, the second cryptogram SK_S*, and the secret key Ki_S. This memory 44 is connected to the software module 34. The unit 14 also includes an unsecure memory 46 containing the first cryptogram SK_H*. This memory 46 is connected to the integrated circuit 24. Information contained in these memories 44 and 46 is easy to modify, for example under the control of an EMM message.

The security processor 16 takes the form of a smart card, for example, adapted to be inserted into the descrambler unit 14. To this end, the unit 14 and the processor 16 each include connection interfaces such as mechanical connectors for coupling and decoupling the unit 14 and the processor 16.

This security processor includes a module 50 for extracting and decrypting a control word contained in an ECM message. This module 50 is connected to the input of a module 52 for encrypting the extracted control word using a session key SK_H or SK_S, before it is sent to the unit 14. To this end, the processor 16 also includes a module 54 for diversifying a root key SK_Root_H or SK_Root_S using the identifier D_ID to obtain the session key SK_H or SK_S. The diversification module 54 is connected to a memory 56 containing the root keys SK_Root_S and SK_Root_H and a secret constant C. The root keys SK_Root_S and SK_Root_H are common to a group of X security processors of the system 2, X being an integer greater than or equal to 1 and strictly less than the total number of security processors used in the system 2. The module 54 diversifies the root key using a known diversification algorithm, such as one of those described in "Applied Cryptography", Bruce Schneier, 1996, John Wiley and Sons, Inc., for the application ANSI X 9.17 to the DES (Data Encryption Standard).

The processor 16 is also equipped with a module 58 for selecting the protection node to be activated in the unit 14 and thus the session key to be used. The module 58 is in particular adapted to control the module 40 for activating the hardware or software protection mode in the unit 14.

The processor 16 also includes a module 60 for creating a strong match between the unit 14 and the processor 16 so that this security processor becomes usable only in combination with the unit 14.

The structure of the devices 7 and 8 is identical to that of the device 6. In contrast, the identifier D_ID, the secret keys Ki_H and Ki_S, and the cryptograms SK_H* and SK_S* are unique to each scrambler unit used in the system 2. Here the session keys having cryptograms that are stored in the descrambler unit of the device 7, are obtained by diversifying the same root keys SK_Root_H and SK_Root_S as those used for the unit 14 by a unique identifier of the device 7. Conversely, the session keys having cryptograms that are stored in the descrambler unit of the device 8, are obtained by diversifying root keys different from the root keys SK_Root_H and SK_Root_S. Accordingly, as becomes clear on reading the remainder of the description, the descrambler units of the devices 6 and 7 form a group of two matched entities of the security processor 16. The descrambler unit of the device 8 does not belong to this group since its session keys are not obtained by diversifying root keys SK_Root_H and SK_Root_S characteristic of this group.

Figure 2:
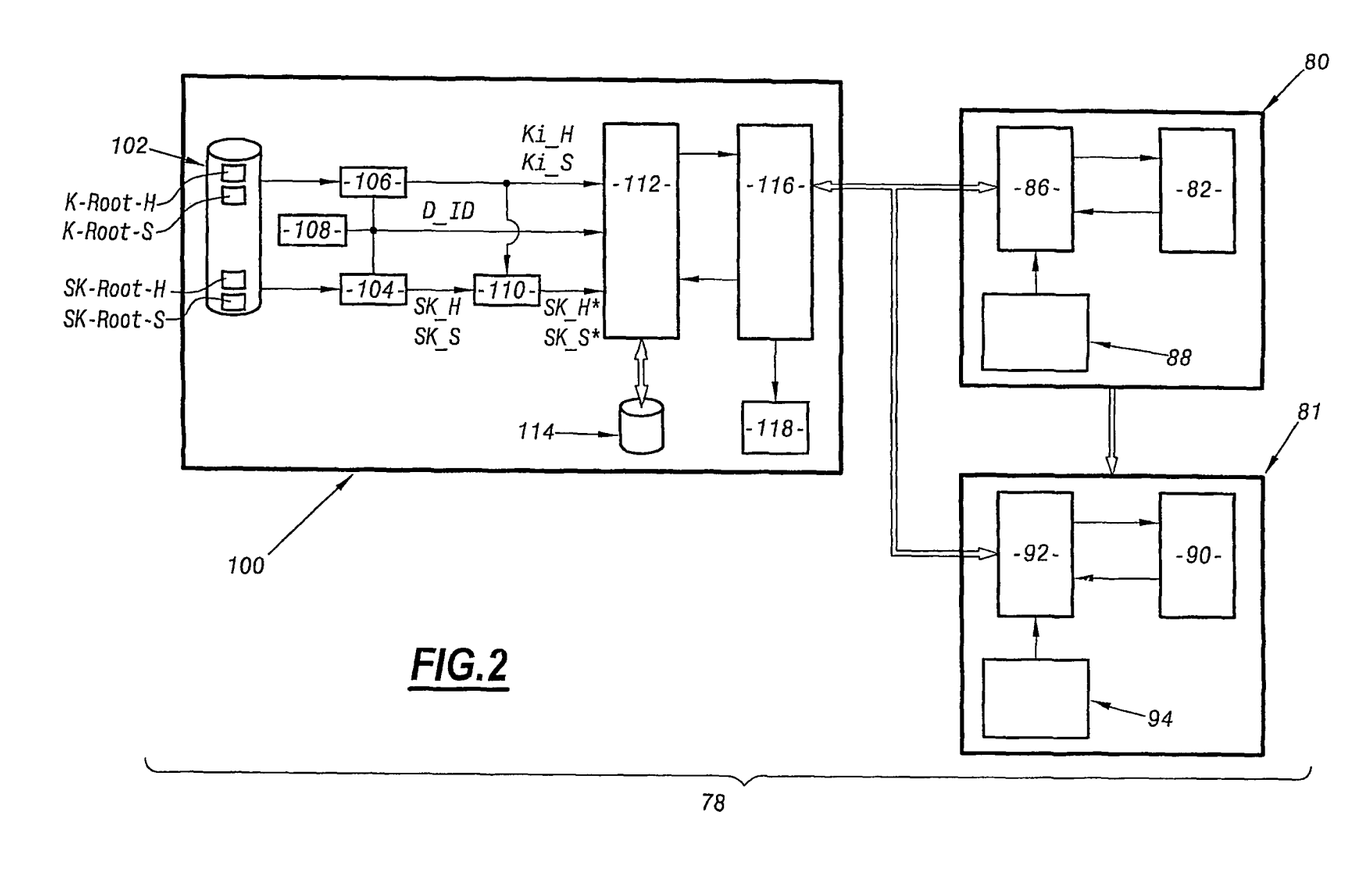
FIG. 2 is a diagrammatic illustration of a system for fabricating security processors and descrambler units used in the system of FIG. 1.

FIG. 2 represents a system 78 for fabricating the descrambler unit 14. This system 78 is designed to enable the manufacturer of the unit 14 to store in the memory 46 the cryptogram SK_H* that can be decrypted by the key Ki_H without the manufacturer needing to know the key Ki_H stored in the memory 26.

The system 78 includes an integrated circuit fabrication facility 80 and a descrambler unit fabrication facility 81 for fabricating the descrambler units incorporating the integrated circuits fabricated by the facility 80. The structure of the integrated circuits fabricated by the facility 80 is identical to that of the circuit 24 and the structure of the descrambler units fabricated by the facility 81 is identical to that described for the unit 14. The reference numbers of the structural components of the fabricated integrated circuits and descrambler units are therefore the same as those used for the integrated circuit 24 and the unit 14.

The facility 80 is equipped with a unit 82 for fabricating the integrated circuits 24 from a raw material such as silicon.

The unit 82 is adapted to store the identifier D_ID and the secret key Ki_H in the memory 26 during fabrication or customization of the circuit 24. To this end, the unit 82 is connected to a black box 86 containing the identifier D_ID and the secret key Ki_H to be stored in each fabricated integrated circuit.

The black box 86 is adapted to receive in encrypted form the list of the identifiers D_ID and of the associated secret keys Ki_H to be stored. That list is encrypted using a so called transport encryption key unique to the facility 80. The unique transport key necessary for decrypting this list is contained in a smart card 88 that can be inserted in the black box 86, for example.

The facility 81 includes a unit 90 for fabricating the units 14 using circuits 24 fabricated by the facility 80. This unit 90 is adapted to store in the memory 44 the identifier D_ID, the cryptogram SK_S*, and the secret key Ki_S and to store in the memory 46 the cryptogram SK_H*. To this end, the facility 81 includes a black box 92 adapted to retrieve the identifier D_ID stored in the memory 26 of the integrated circuit used to fabricate the unit 14 and to send in response the data to be stored in the memories 44 and 46 of the unit 14.

The box 92 is also adapted to receive the list of identifiers D_ID, cryptograms SK_H*, SK_S* and secret keys Ki_S associated therewith to be stored in the memories 44 and 46. This list is encrypted using a so called transport encryption key unique to the facility 81. The unique transport key for decrypting the received list is stored in a smart card 94 that can be inserted in the black box 92, for example.

The system 78 also includes a higher authority 100 adapted to generate and to manage a central database containing all of the data to be stored in the memories 26, 44 and 46. This authority 100 includes a secure memory 102 containing the root keys SK_Root_H and SK_Root_S and also two additional root keys K_Root_H and K_Root_S. This memory 102 is connected to diversification modules 104 and 106 adapted to generate, respectively, the session keys SK_H and SK_S and the secret keys Ki_H and Ki_S.

The modules 104 and 106 are connected to a module 108 for generating identifiers D_ID.

An output of the modules 104 and 106 is also connected to corresponding inputs of a module 110 for encrypting session keys.

Outputs of the modules 106, 108 and 110 are connected to a module 112 for creating and managing the central database 114 containing for each identifier D_ID the associated cryptograms SK_H* and SK_S* and the secret keys Ki_H and Ki_S for decrypting those cryptograms to obtain the session keys SK_H and SK_S.

The module 112 is adapted to send the data to be stored to the black boxes 86 and 92 following encryption with a transport key. To this end, the authority 100 includes an encryption module 116 and a smart card 118 containing the transport key(s).

The operation of the system 78 for fabricating the descrambler units is described below with reference to FIG. 3 for the unit 14.

Initially, in a step 130, prior to the fabrication of the unit 14, the authority 100 creates or completes the database 14. More precisely, during an operation 132, the module 108 generates an identifier D_ID. That identifier D_ID is then used by the module 104, during an operation 134, to diversify each of the root keys SK_Root_H and SK_Root_S to obtain the session keys SK_H and SK_S, respectively, associated with that identifier D_ID. Thus the session keys are unique to each descrambler unit of the system 2.

In parallel with this, during an operation 136, the module 106 diversifies each of the root keys K_Root_H and K_Root_S using the identifier D_ID to obtain the seret_keys Ki_H and Ki_S, respectively, associated with that identifier D_ID. Thus the keys Ki_H and Ki_S are unique to each descrambler unit of the system 2.

Then, during an operation 138, the module 110 encrypts each of the session keys SK_H and SK_S using the associated secret keys Ki_H and Ki_S, respectively, to obtain the cryptograms SK_H* and SK_S*. The cryptograms SK_H* and SK_S* are thus also unique to each descrambler unit of the system 2.

The identifier D_ID, the cryptograms SK_H* and SK_S* and the secret keys Ki_H and Ki_S are associated and stored by the management module 112 in the database 114 during an operation 140.

The operations 132 to 140 are repeated for each identifier generated by the module 108 so that the database 114 contains at least as many identifiers D_ID as there are descrambler units to be fabricated by the facility 80.

Once this database 114 has been created, a portion of the database 114, containing only the secrets necessary for fabricating the circuits 24, is sent in encrypted form to the black box 86. To this end, the management module 112 extracts from the database 114, during a step 142, a list of data containing for each identifier D_ID the secret key Ki_H that is associated with it. This list of data is then encrypted by the module 116, during a step 144, using the unique transport key of the facility 80, before being sent to the black box 86 during a step 146.

On reception of this list of data, the black box 86 decrypts the list during a step 148 using the transport key stored in the smart card 88.

Then, during a step 150, the black box 86 sends the identifier D_ID and the secret key Ki_H to be stored in an integrated circuit to the fabrication unit 82. This data can be sent with local encryption specific to the fabrication unit 82.

During a step 152, the fabrication unit 82 stores in the secure memory 26 of the fabricated integrated circuit the identifier D_ID and the secret key Ki_H associated therewith sent during the step 150.

Here the identifier D_ID and the secret key Ki_H are different for each integrated circuit fabricated.

The steps 150 to 152 are repeated for each integrated circuit fabricated by the unit 82.

On completion of the fabrication of a batch of integrated circuits, the black box 86 sends the authority 100 a report of the fabrication of the integrated circuits, during a step 158. That report contains the list of the identifiers D_ID used during the steps 150 and 152.

During a step 160, the integrated circuits fabricated by the facility 80 are shipped to the facility 81.

In parallel with this, during a step 162, the authority 100 sends the facility 81 a list containing only the information necessary for the fabrication of the units 14. More precisely, during an operation 164, the module 112 extracts from the database 114 a list of data containing for each identifier D_ID the cryptograms SK_H* and SK_S* and the secret key Ki_S. The extracted list is encrypted by the module 116 during an operation 166, using the unique transport key corresponding to that stored in the smart card 94. Once encrypted, this list is sent to the black box 92 during an operation 168.

During a step 170, the black box 92 uses the transport key stored in the smart card 94 to decrypt the list sent.

Then, in a step 172 during fabrication of a unit 14, the fabrication unit 90 reads the identifier D_ID present in the integrated circuit used to fabricate the unit 14 and sends it to the black box 92. In response, during a step 174, the black box 92 sends the unit 90 the cryptograms SK_H* and SK_S* and the secret key Ki_S corresponding to the identifier D_ID sent during the step 172. This data can be sent with local encryption specific to the fabrication unit 90.

During a step 176 the unit 90 stores the data sent during the step 174 in the memories 44 and 46 of the unit 14 being fabricated.

The steps 172 to 176 are repeated for each unit 14 fabricated.

Accordingly, by means of this fabrication process, the unit 90 is able to store the cryptogram SK_H* that can be decrypted using the secret key Ki_H without knowing that secret key.

Moreover, it should be noted that encrypting the information sent from the authority 100 to the facilities 80 and 81 with respective transport keys prevents information sent to the facility 80, for example, from being used in another integrated circuit fabrication facility. Indeed, that other fabrication facility, even if its equipped with a black box identical to the black box 86, does not know the transport key for decrypting the information that is not intended for it.

This encryption effected by the module 116 therefore renders the information sent to the facility non-interchangeable.

Once fabricated, the units 14 are sold and incorporated into receiver devices such as the device 6.

The operation of the receiver device 6 is described below in relation to the method of FIG. 4.

When the security processor 16 is inserted into the unit 14, the module 58 selects, during a step 190, the hardware or software protection mode for protecting the control word to be activated. To this end, during the step 190, the module 58 exchanges, for example, information with the unit 14 to choose the protection mode to be activated for example.

In a first example, the protection mode is prestored in the security processor 16 during its customization or by an EMM message received previously. The security processor 16 imposes this protection mode on the unit 14 via the module 58, during the step 190. If the unit 14 does not support the protection mode imposed in this way, the dialogue between the two entities stops at the initiative of either of the two entities.

In a second example the protection mode is selected by applying the following rule during the step 190:
  if the descrambler unit is able to use the hardware protection mode and the software protection mode, or if the descrambler unit is able to use only the hardware protection mode, then only the hardware protection mode for protecting the control word is selected;
  if the descrambler unit is able to use only the software protection mode for protecting the control word, then only the software protection mode is selected.

Then, during a step 192, the module 58 communicates with the module 40 to activate the protection mode selected during the step 190.

In parallel with this, during a step 193, the diversification module 54 selects only the root key SK_Root_H if the hardware protection mode is activated or only the root key SK_Root_S if the software protection mode is activated.

For the unit 14 described with reference to FIG. 1, only the hardware protection mode is activated.

When initializing the processor 16, once the protection mode has been chosen, the module 38 sends the identifier D_ID of the unit 14 to the diversification module 54 in unencrypted form, during a step 194.

In response, during a step 196, the module 54 diversifies the root key SK_Root_H selected during the step 193 using the identifier D_ID to obtain the session key SK_H.

For example, during the step 196, the module 54 encrypts the identifier D_ID using the root key SK_Root_H. The identifier D_ID encrypted in this way is then combined with the constant C and the result of this combination is again encrypted using the key SK_Root_H in order to obtain the key SK_H.

Still during initialization, in a step 198, the module 30 decrypts the cryptogram SK_H* contained in the memory 46 using the secret key Ki_H contained in the memory 26 in order to obtain the session key SK_H.

Then, during reception of ECM messages, the module 50 extracts and decrypts, during a step 200, the control words contained in ECM messages sent to it by the receiver via the unit 14. These extracted control words decrypted during the step 200 are then encrypted during a step 202 by the module 52 using the key SK_H obtained during the step 196. The cryptogram CW* resulting from the encryption step 202 is then sent to the unit 14 during a step 204.

Each time the unit 14 receives an encrypted control word, the module 28 decrypts, during a step 208, the control word encrypted using the session key obtained during the step 198.

The control word decrypted in this way is then communicated to the descrambler 22 which, during a step 210, descrambles the scrambled multimedia signals and communicates them to the display unit 20 via the receiver 10.

During a step 212, the display unit 20 displays the multimedia signals descrambled by the unit 14.

At any time after initialization of the processor 16, the processor can receive, during a step 220, a strong matching command, for example, contained in an EMM message.

From this moment onwards, in response to such a command, the module 60 renders the root key unusable, during a step 222, in order to fix the session key. For example, here the root key SK_Root_H is replaced by the current session key, which here is key SK_H.

From now onwards, the processor 16 can no longer be used in a descrambler unit other than the unit 14. In fact, after the step 222, the processor 16 can no longer obtain a session key identical to that used by a new descrambler unit corresponding to an identifier D_ID different from that of the unit 14.

The operation of the processor 16 and the unit 14, when only software protection of the control word is activated, is deduced from that which has just been described in relation to the steps 190 to 212 by replacing:
- the decryption modules 28 and 30 by the decryption modules 35 and 36, respectively;
- the root key SK_Root_H by the root key SK_Root_S;
- the cryptogram SK_H* by the cryptogram SK_S*; and
- the secret key Ki_H by the secret key Ki_S.

The operation of the devices 7 and 8 is deduced from the operation of the device 6. In particular, if the processor 16 is inserted into the descrambler unit of the device 7, the process that has just been described with reference to FIG. 4 proceeds in exactly the same way and the multimedia signals are descrambled correctly, unless strong matching has been activated in the processor 16.

In contrast, if the processor 16 is inserted into the descrambler unit of the device 8, the session keys obtained by that descrambler unit and the processor 16 are different, since the session key of the descrambler unit of the device 8 is not obtained by diversifying one of the root keys SK_Root_H or SK_Root_S. Consequently, the device 8 does not decrypt correctly the control word received from the processor 16 and therefore obtains an erroneous value of the control word, with which the multimedia signals cannot be descrambled correctly. This checks that the processor 16 is matched with any descrambler unit of the devices 6 and 7 but is not matched with the descrambler unit of the device 8.

It should be noted that for each security processor/descrambler unit pair, the session key used is unique to that pair since it depends on the identifier of the descrambler unit. This is advantageous. In fact, if the control word encrypted by the processor 16 when it is inserted into the unit 14 is intercepted and then sent to another descrambler unit belonging to the same group as the unit 14, for example the descrambler unit of the device 7, that other descrambler unit will not be able to decrypt the intercepted control word. From this point on it is not possible to run information sent by a single security processor through a plurality of descrambler units.

Figure 3:
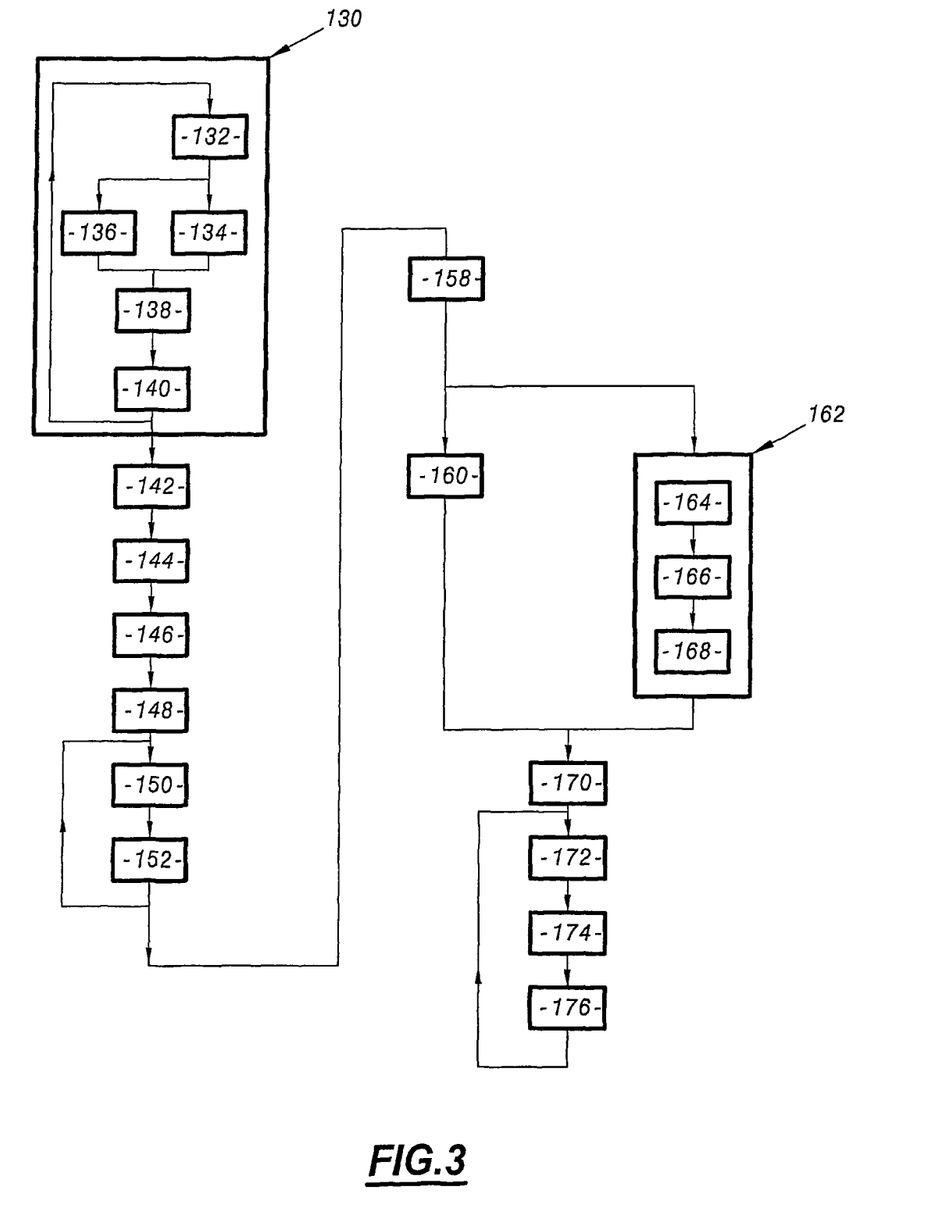
FIG. 3 is a flowchart of a method of fabricating security processors and descrambler units used in the system of FIG. 1.

Many other embodiments of the system 78 and the method from FIG. 3 are possible. For example, in one variant, a serial number H_ID of the integrated circuit produced by the fabrication unit 82 is used instead of the identifier D_ID. In this variant, the box 86 reads off the serial number H_ID of the integrated circuit and associates it with the secret key Ki_H stored in its memory 26. The serial number of the integrated circuit is then sent to the authority 100 in the report so that it can be used in association with the identifier D_ID.

Figure 4:
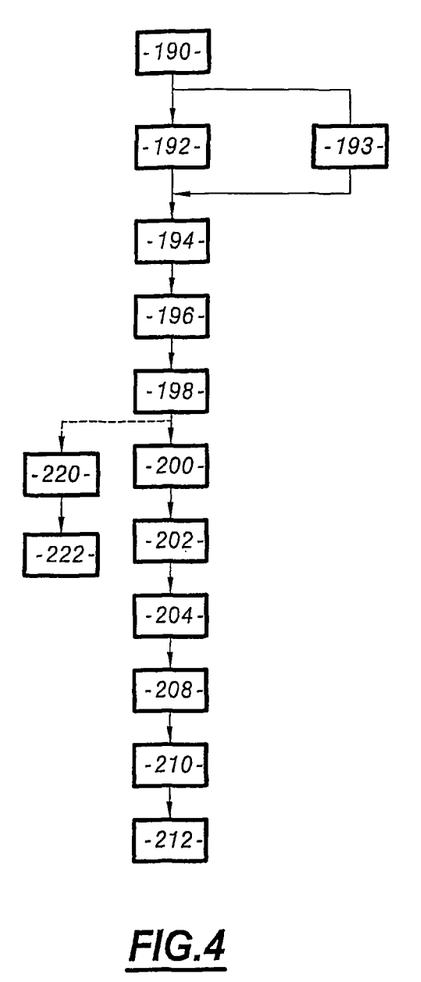
FIG. 4 is a flowchart of a method of receiving a scrambled multimedia signal used in the system of FIG. 1.

Many other embodiments of the system 2 and the method from FIG. 4 are equally possible.

Here the entity 14 establishes the session key without using a diversification module. Alternatively, the entity 14 includes a diversification module and a root key identical to that contained in the entity 16, so as to obtain the session key by diversifying the root key.

The descrambler units have been described as removable. Alternatively, they are attached and fixed to the receiver.

Here the descrambler unit 14 is described in the very particular circumstances where it is adapted to use a hardware protection mode or a software protection mode. However, as an alternative to this, the descrambler unit can be adapted to use only one of the two detection modes. For example, if the descrambler unit uses only the software protection mode, then the descrambler unit has no integrated circuit 24, secure memory 26 or unsecure memory 46. Similarly, the system for fabricating such a descrambler unit is simplified since the black box 86 can be omitted and the facility 80 eliminated. In contrast, the system of FIG. 2 must be modified so that the black box 92 sends only the identifier D_ID, the cryptogram SK_S* and the secret key Ki_S.

Conversely, if the descrambler unit uses only the hardware protection mode, then the descrambler unit has no decryption modules 35 and 36 and no memory 44. The fabrication system for such a descrambler unit differs from the system 78 only by virtue of the fact that it is modified so that the black box 92 sends only the cryptogram SK_H* to be stored in the memory 46.

Here the algorithm for decrypting the control word is different from that used to decrypt the session key. Alternatively, these algorithms are identical so that a single decryption module is needed rather than two.

In the system 2, the identifier D_ID is sent to the processor 16 when it is inserted in the unit 14. Alternatively, the identifier D_ID can be sent to the processor 16 via an EMM message. It is equally possible, in another variant, to store the identifier D_ID in the memory 56 of the processor 16 at the same time as the root keys SK_Root_S and SK_Root_H are stored in the same memory. Under such circumstances, a match is created between the processor 16 and the unit 14 even before the processor 16 has been inserted into the unit 14 for the first time.

If necessary, either or both of the root keys SK_Root_H and SK_Root_S can be replaced by new root keys. In parallel with such replacement of the root keys, the cryptograms SK_H* and SK_S* must also be replaced with new cryptograms. Those new cryptograms are obtained by diversifying the new root keys. For example, these new keys can be updated in the processor 16 and in the unit 14 by EMM messages. This modification of the root keys is, for example, useful after using strong matching to render the new processor 16 usable in another descrambler unit.

Alternatively, the strong match between the security processor and the descrambler unit is obtained by rendering the identifier D_ID unusable by one of the two entities to be matched. For example, the last identifier D_ID used to create a session key is fixed, i.e. that identifier D_ID is no longer modifiable. From this moment onwards, if the security processor is inserted into another descrambler unit, the new identifier D_ID sent is not used to diversify the root key and the session key obtained is incorrect.

Here, the root keys SK_Root_H and SK_Root_S have been described as being common to all of the descrambler units of the same group and to the security processors that are matched with them. However, the root key SK_Root_H can instead be common to the descrambler units and the security processors of a first group, whereas the root key SK_Root_S is common to the descrambler units and the security processors of a second group different from the first. It is therefore possible to define different matches according to whether the hardware or software protection mode is used.

Figure 5:
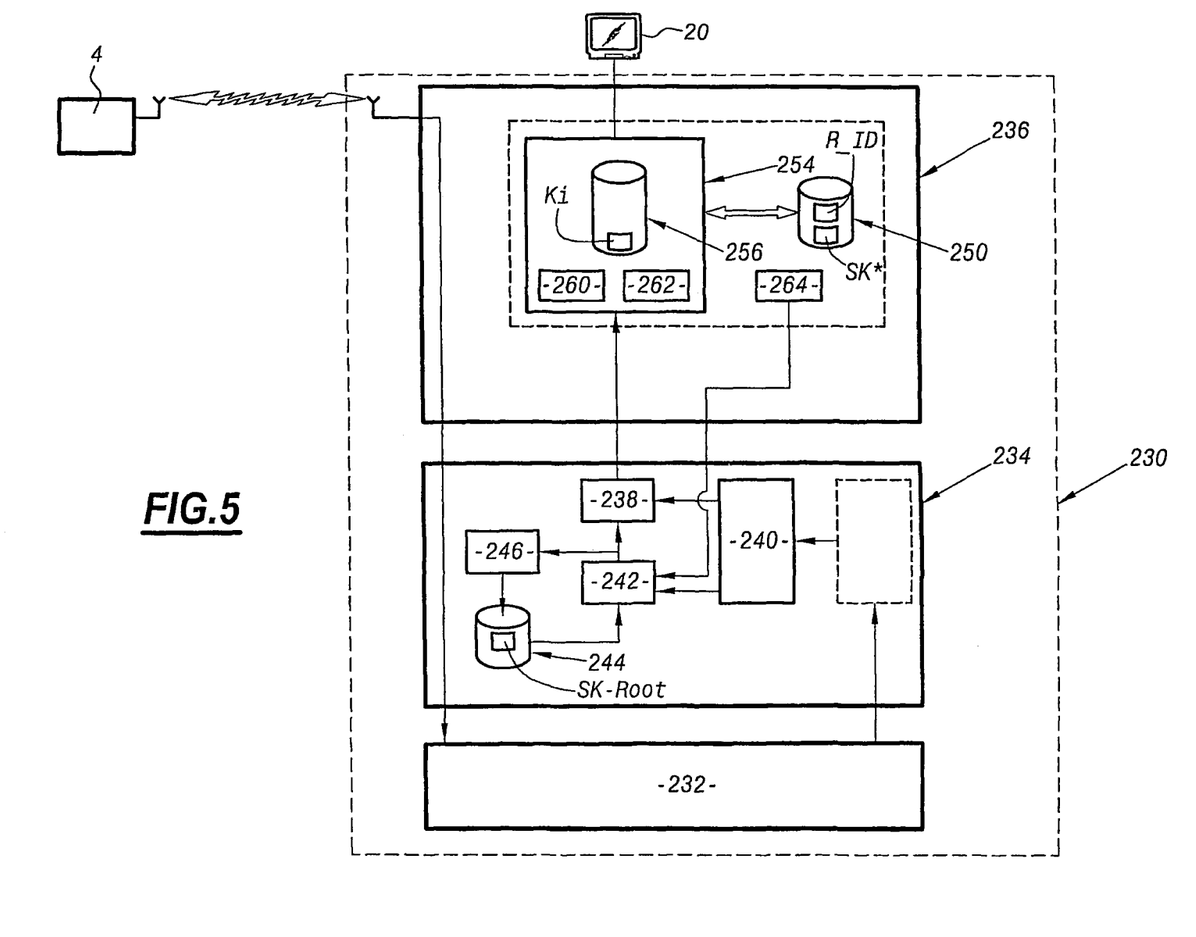
FIG. 5 is a diagrammatic illustration of another embodiment of the system of FIG. 1.

What has been described for encrypting and decrypting control words transmitted between a security processor and a descrambler unit can also be applied to encrypting a descrambled multimedia signal transmitted between the descrambler unit and the receiver. For example, FIG. 5 represents a receiver device 230 in which control words sent by a security processor 232 to a descrambler unit 234 are encrypted, as are descrambled multimedia signals sent from the unit 234 to a receiver 236. In FIG. 5, elements already described with reference to FIG. 1 carry the same reference numbers. Moreover, the modules necessary for establishing a session key between the security processor 232 and the descrambler unit 234 as well encryption of the control words are identical to those described with reference to FIG. 1 and have been omitted to simplify FIG. 5.

In this embodiment, the unit 234 includes an encryption module 238 adapted to encrypt the multimedia signals descrambled by a descrambler 240 using a session key SK.

The unit 234 also includes a diversification module 242 adapted to diversify a root key SK_Root contained in a memory 244 to obtain the session key SK.

Like the processor 16, the unit 234 also includes a strong matching module 246 for replacing the root key SK_Root by the key SK in response to a strong matching command.

The receiver 236 includes a memory 250 containing an identifier R_ID and a cryptogram SK* of the session key SK obtained by encrypting the key SK using a secret key Ki. The memory 250 is not secure. The receiver 236 also includes a security integrated circuit 254 equipped with a secure memory 256 containing the secret key Ki. This integrated circuit 254 also includes a module 260 for decrypting the encrypted multimedia signals and a module 262 for decrypting the cryptogram SK*.

Finally, the receiver 236 includes a module 264 for sending the identifier R_ID to the unit 234.

As in the system 2, it is possible to create a group of receivers matched to the descrambler unit 234. To this end, all the receivers belonging to the same group as that containing the receiver 236 contain a cryptogram of a session key obtained by diversifying the root key SK_Root using their own identifier R_ID.

The session keys are initialized in the receiver 236 and in the unit 234 in exactly the same way as has been described for initializing a session key between the unit 14 and the processor 16, which is therefore not described in detail here. Similarly, once identical session keys have been initialized in the receiver 236 and the unit 234, the descrambled multimedia signals are encrypted in a similar way to that described for the control word.

If the same unit 234 initializes session keys firstly with the receiver 236, and secondly with a processor 16, the root keys, the identifiers, and the diversification algorithms do not have to be the same at the two interfaces.

If the unit 234 is used in a receiver that does not belong to the group of receivers containing the receiver 236, then the session keys obtained by the unit 234 and by this other receiver are not identical, with the result that the other receiver cannot decrypt correctly multimedia signals encrypted by the unit 234. Thus the multimedia signals are displayed only if the unit 234 is used in one of the receivers of the group containing the receiver 236.

For the FIG. 5 embodiment, only the hardware mode of protecting the interface between the receiver and the descrambler unit has been described. Nevertheless, a software protection mode can be used, as in protecting the interface between the descrambler unit and the security processor.

The variants described above for protecting the descrambler unit/security processor interface apply equally to protecting the receiver/descrambler unit interface.

What has been described with reference to FIGS. 2 and 3 for isolating the secret data sent to the security integrated circuit fabricator from that sent to the facility that utilizes those integrated circuits is alternatively adapted to the fabrication of the receiver 236. Under such circumstances, the fabrication unit 90 is replaced by a fabrication unit for the receivers 236.

The invention claimed is:

1. A method of receiving a multimedia signal scrambled using a control word, said method comprising:

receiving a scrambled multimedia signal by a receiver device, the receiver device comprising a first cryptographic entity and P second cryptographic entities, the first cryptographic entity and one of the P second cryptographic entities being connected within a receiver device for receiving the scrambled multimedia signal, the first cryptographic entity being either a security processor, or a descrambler unit;

encrypting the control word or the multimedia signal with the first cryptographic entity using a first cryptographic entity session key and sending the encrypted control word or the encrypted multimedia signal from the first cryptographic entity to the second cryptographic entity; and decrypting the encrypted control word or the encrypted multimedia signal sent from the first cryptographic entity, by the second cryptographic entity using a second cryptographic session key, the first session cryptographic session key and the second cryptographic session keys being obtained by diversifying root keys using a same identifier known to both of the first cryptographic and the second cryptographic entity, wherein only the second cryptographic entities from a group of N second cryptographic entities chosen in the larger set of P second cryptographic entities use a session key obtained by diversifying a common root key identical to the root key used to obtain the first cryptographic entity session key, N being a number of second cryptographic entities strictly less than P and strictly greater than 1; and wherein if the first cryptographic entity is a security processor, then the second cryptographic entity is a descrambler unit, or if the first cryptographic entity is a descrambler unit, then the second cryptographic entity is a scrambled multimedia signal receiver.

2. The method according to claim 1, wherein the first cryptographic entity or the second cryptographic entity is equipped with a diversification module for diversifying the root key to obtain either the first cryptographic entity session key or second cryptographic entity session key, and wherein after a connection of the first cryptographic entity to one of the second cryptographic entities of said group is established, at least the first cryptographic entity or the second cryptographic entity diversifies the root key stored by the identifier to obtain the first cryptographic entity session key or second cryptographic entity session key using the diversification module and then renders that diversification module unusable for the creation of a new session key so as to match that cryptographic entity only to the other cryptographic entity to which it is connected.

3. The method according to claim 2, wherein the diversification module is rendered unusable by rendering the root key to be diversified unusable.

4. The method according to claim 1, wherein after connection of the first cryptographic entity to one of the second cryptographic entities, either the first cryptographic entity or the second cryptographic entity sends the identifier to the other cryptographic entity in unencrypted form.

5. The method according to claim 1, for second cryptographic entities adapted to implement a hardware and/or software mode of protection of an interface with the first cryptographic entity, said method further comprising, selecting the session key or the root key as for obtaining the first cryptographic entity session key to be used as a function of the protection mode that the first cryptographic entity imposes on the second cryptographic entity or used by the second cryptographic entity.

6. A second cryptographic device, comprising:
   a second cryptographic entity adapted for connection to a first cryptographic entity within a receiver device and for receiving a scrambled multimedia signal, the first cryptographic entity being either a security processor, or a descrambler unit,
      said second cryptographic entity having a processor to decrypt an encrypted control word or an encrypted multimedia signal sent by the first cryptographic entity using a second cryptographic session key, wherein the second cryptographic session key is obtained by said second cryptographic entity diversifying a root key identical to a root key used to obtain session keys of a group of N second cryptographic entities chosen from a larger set of P second cryptographic entities, N being a number of second cryptographic entities strictly less than P and strictly greater than 1, wherein if the first cryptographic entity is a security processor, then the second cryptographic entity is a descrambler unit, or if the first cryptographic entity is a descrambler unit, then the second cryptographic entity is a scrambled multimedia signal receiver.

7. The second cryptographic device according to claim 6, further comprising an unsecure memory containing at least a prestored cryptogram of the second cryptographic session key.

8. The second cryptographic device according to claim 6, wherein the first cryptographic entity is adapted to diversify the root key by means of an identifier to obtain the second cryptographic session key, wherein the second cryptographic entity includes a transmission module (38) adapted to send the identifier to the first cryptographic entity in unencrypted form after connection of the first cryptographic entity to the second cryptographic entity.

9. The second cryptographic device according to claim 7, wherein said second cryptographic entity includes a security integrated circuit including a secure memory containing a decryption key, a first algorithm for decrypting a prestored cryptogram to obtain the second cryptographic entity session key, and a second algorithm for decrypting the encrypted control word or the encrypted multimedia signal sent by the first cryptographic entity using the second cryptographic entity session key decrypted by the first algorithm.

10. The second cryptographic device according to claim 7, further comprising:
   an unsecure memory in which is stored a cryptogram of the second cryptographic entity session key, that cryptogram having been obtained by encrypting the second cryptographic entity session key with a secret key; and
   a security integrated circuit containing:
      a) a secure memory in which the secret key is stored; and
      b) an algorithm for decrypting the cryptogram using the secret key.

11. A system for receiving a multimedia signal scrambled using a control word, said system comprising:
   a first cryptographic entity and P second cryptographic entities, said first cryptographic entity being either a security processor or a descrambler unit, adapted to be connected to any one of the P second cryptographic entities, said first cryptographic entity and one of said P second cryptographic entities being connected within a receiver device for receiving the scrambled multimedia signal, the first cryptographic entity being adapted to encrypt the control word or the multimedia signal descrambled using a first cryptographic entity session key and to send the encrypted control word or the multimedia signal encrypted in this way to the second cryptographic entity to which said first cryptographic entity is connected, each second cryptographic entity being adapted to decrypt the encrypted control word or the encrypted multimedia signal sent by the first cryptographic entity using a second cryptographic entity session key, the first cryptographic entity session key and the second cryptographic entity session key being obtained by diversifying a root key using the same identifier,
   wherein only the second cryptographic entities of a group of N second cryptographic entities chosen in the larger set of P second cryptographic entities are adapted to use a session key obtained by diversifying a common root key and identical to the root key used to obtain the first cryptographic entity session key, N being a number of second cryptographic entities strictly less than P and strictly greater than 1.

12. A system for fabricating a second cryptographic entity according to claim 6, said system comprising:
   a central database in which is stored, for each security integrated circuit usable for the fabrication of a second cryptographic entity, a unique identifier of that integrated circuit associated with the cryptogram obtained by encrypting a session key with the secret key prestored in the secure memory of the integrated circuit;
   a first unit for fabricating the second cryptographic entity using a security integrated circuit including the unique identifier of that integrated circuit and the secure memory in which the secret key is prestored, the first unit being adapted to store in the unsecure memory of the second cryptographic entity the cryptogram of the session key;
   a first black box adapted:
      1) to retrieve the unique identifier of the integrated circuit used to fabricate the second cryptographic entity; and
      2) to send the first unit, in response, the cryptogram associated with the identifier retrieved in the central database so that the first unit can store that cryptogram in the unsecure memory of this second cryptographic entity.

13. The system according to claim 12, further comprising:
   a second unit for fabricating security integrated circuits, said second unit being adapted to store in the secure memory of each fabricated integrated circuit the secret key and the unique identifier of the integrated circuit; and
   a second black box adapted to send the second unit the identifier of the integrated circuit and the secret key to be stored in the secure memory of the fabricated integrated circuit.

14. A device used in the system according to claim 13, said device adapted:
   to retrieve the identifier of the integrated circuit used to fabricate the second cryptographic entity; and
   to send to the first unit, in response, the cryptogram associated with the identifier retrieved in the central database so that the first unit can store that cryptogram in the unsecure memory of that second cryptographic entity.

15. A device used in the system according to claim 13, said device adapted to send the second unit the unique identifier of the integrated circuit and the secret key to be stored in the secure memory of the fabricated integrated circuit.

16. A method of fabricating a second cryptographic entity for receiving a multimedia signal scrambled using a control word according to claim 1, said method comprising:
    providing a security integrated circuit containing:
        a) a secure memory in which a secret key is stored,
        b) an algorithm for decrypting a cryptogram using the secret key, and
        c) a unique identifier of the integrated circuit,
    storing, in the central database, for each security integrated circuit usable for the fabrication of the second cryptographic entity, the unique identifier of the integrated circuit associated with the cryptogram obtained by encrypting a session key with the secret key prestored in the secure memory of that integrated circuit, the session key being obtained by diversifying a root key identical to the root key used to obtain the session keys of the group of N second cryptographic entities,
    during fabrication of the second cryptographic entity using a security integrated circuit including the unique identifier of that integrated circuit and the secure memory in which the secret key is prestored:
        a) a first black box retrieves the unique identifier of the integrated circuit used to fabricate the second cryptographic entity and sends in response, the cryptogram associated with the identifier retrieved in the central database to a first fabrication unit of the second cryptographic entity; and
        b) the first fabrication unit stores the sent cryptogram in the unsecure memory of the second cryptographic entity.

17. The method according to claim 16, wherein:
    a second black box sends a second integrated circuit fabrication unit the identifier of each integrated circuit and the secret key to be stored in the secure memory of the fabricated integrated circuit; and
    the second fabrication unit stores the secret key and the unique identifier of the integrated circuit sent by the second black box in the secure memory of the fabricated integrated circuit.

18. A method of receiving a multimedia signal scrambled using a control word, said method comprising:
    receiving a scrambled multimedia signal by a receiver device, the receiver device comprising a first cryptographic entity and P second cryptographic entities, the first cryptographic entity and one of the P second cryptographic entities being connected within a receiver device for receiving the scrambled multimedia signal, the first cryptographic entity being either a security processor, or a descrambler unit;
    encrypting the control word or descrambling the multimedia signal with the first cryptographic entity using a first cryptographic entity session key and then sending the encrypted control word or the encrypted multimedia signal to the second cryptographic entity; and
    decrypting the encrypted control word or the encrypted multimedia signal sent from the first cryptographic entity, by the second cryptographic entity using a second cryptographic entity session key, the first cryptographic entity session key and the second cryptographic entity session key being obtained by diversifying root keys using the same identifier known to both of the first and second cryptographic entities,
    wherein only the second cryptographic entities from a group of N second cryptographic entities chosen in the larger set of P second cryptographic entities use a session key obtained by diversifying a common root key identical to the root key used to obtain the first cryptographic entity session key, N being a number of second cryptographic entities strictly less than P and strictly greater than 1, and
    wherein for a first cryptographic entity or a second cryptographic entity equipped with a module for diversifying the root key to obtain the session key, after connection of the first cryptographic entity to one of the second cryptographic entities of said group, at least the first cryptographic entity or the second cryptographic entity diversifies the root key stored by said identifier to obtain the session key using the diversification module and then renders that diversification module unusable for the creation of a new session key so as to match that cryptographic entity only to the other cryptographic entity to which it is connected.

19. A method of receiving a multimedia signal scrambled using a control word, said method comprising:
    receiving a scrambled multimedia signal by a receiver device, the receiver device comprising a first cryptographic entity and P second cryptographic entities, the first cryptographic entity and one of the P second cryptographic entities being connected within a receiver device for receiving the scrambled multimedia signal, the first cryptographic entity being either a security processor, or a descrambler unit; encrypting the control word or the multimedia signal with the first cryptographic entity using a first cryptographic entity session key and then sends the encrypted control word or the encrypted multimedia signal to the second cryptographic entity; and
    decrypting the encrypted control word or the encrypted multimedia signal sent from the first cryptographic entity, by the second cryptographic entity using a second cryptographic entity session key, the first cryptographic entity session key and the second cryptographic entity key being obtained by diversifying root keys using the same identifier known to both of the first and second cryptographic entities,
    wherein only the second cryptographic entities from a group of N second cryptographic entities chosen in the larger set of P second cryptographic entities use a session key obtained by diversifying a common root key identical to the root key used to obtain the session key of the first cryptographic entity, N being a number of second cryptographic entities strictly less than P and strictly greater than 1, and
    wherein after connection of the first cryptographic entity to one of the second cryptographic entities, either the first cryptographic entity or the second cryptographic entity sends the identifier to the other cryptographic entity in unencrypted form.

20. A method of receiving a multimedia signal scrambled using a control word, said method comprising:
    receiving a scrambled multimedia signal by a receiver device, the receiver device comprising a first cryptographic entity and P second cryptographic entities, the first cryptographic entity and one of the P second cryptographic entities being connected within a receiver device for receiving the scrambled multimedia signal, the first cryptographic entity being either a security processor or a descrambler unit;
    encrypting the control word or the multimedia signal with the first cryptographic entity using a first cryptographic entity session key and then sends the encrypted control word or the encrypted multimedia signal to the second cryptographic entity; and decrypting the encrypted control word or the encrypted multimedia signal sent by the first cryptographic entity, by the second cryptographic entity, using a second cryptographic entity session key, the first cryptographic entity session key and the second cryptographic entity session key being obtained by diversifying root keys using the same identifier known to both of the first and second cryptographic entities, wherein only the second cryptographic entities from a group of N second cryptographic entities chosen in the larger set of P second cryptographic entities use a session key obtained by diversifying a common root key identical to the root key used to obtain the first cryptographic entity session key, N being a number of second cryptographic entities strictly less than P and strictly greater than 1, and wherein for second cryptographic entities adapted to implement a hardware and/or software mode of protection of an interface with the first cryptographic entity, after connection of the first cryptographic entity to one of these second cryptographic entities, the first cryptographic entity selects the session key or the root key for obtaining the session key to be used as a function of the protection mode that the first cryptographic entity imposes on the second cryptographic entity.

* * * * *